United States Patent
Lee

(10) Patent No.: US 9,354,759 B2
(45) Date of Patent: May 31, 2016

(54) TOUCH SCREEN PANEL

(71) Applicant: Samsung Display Co., Ltd., Yongin, Gyeonggi-do (KR)

(72) Inventor: Gil-Jae Lee, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/498,741

(22) Filed: Sep. 26, 2014

(65) Prior Publication Data

US 2015/0097807 A1    Apr. 9, 2015

(30) Foreign Application Priority Data

Oct. 4, 2013    (KR) .................. 10-2013-0118335

(51) Int. Cl.
*G06F 3/044*    (2006.01)
*G06F 3/041*    (2006.01)

(52) U.S. Cl.
CPC .............. *G06F 3/044* (2013.01); *G06F 3/0418* (2013.01)

(58) Field of Classification Search
CPC ............................... G06F 3/0418; G06F 3/044
USPC ......................................................... 345/173
See application file for complete search history.

(56) References Cited

U.S. PATENT DOCUMENTS

| | | | |
|---|---|---|---|
| 2010/0328265 A1 | 12/2010 | Hotelling et al. | |
| 2013/0082977 A1* | 4/2013 | Noguchi | G06F 3/0412 345/174 |
| 2013/0093722 A1* | 4/2013 | Noguchi | G06F 3/0412 345/174 |
| 2014/0092061 A1* | 4/2014 | Akai | G06F 3/0416 345/174 |

FOREIGN PATENT DOCUMENTS

| | | |
|---|---|---|
| EP | 0 818 751 A1 | 1/1998 |
| KR | 1998-0010726 A | 4/1998 |
| KR | 10-2010-0103045 A | 9/2010 |

* cited by examiner

*Primary Examiner* — Viet Pham
(74) *Attorney, Agent, or Firm* — Knobbe, Martens, Olson & Bear, LLP

(57) ABSTRACT

A touch screen panel is disclosed. In one aspect, the touch screen panel includes a plurality of first touch electrodes, a plurality of second touch electrodes, and an electrode driving unit. The second touch electrodes cross the first touch electrodes. The electrode driving unit applies a driving signal including a plurality of driving pulses to the first touch electrodes. The electrode driving unit changes the width of each of the driving pulses while maintaining the frequency of the first driving pulses.

18 Claims, 2 Drawing Sheets

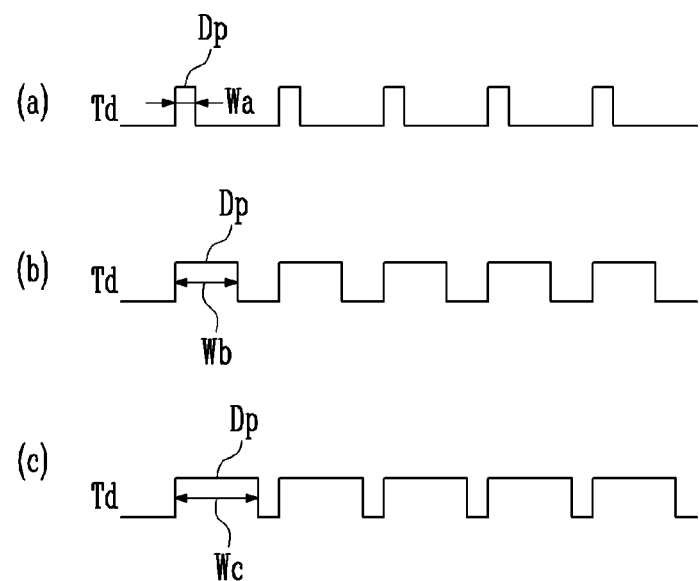
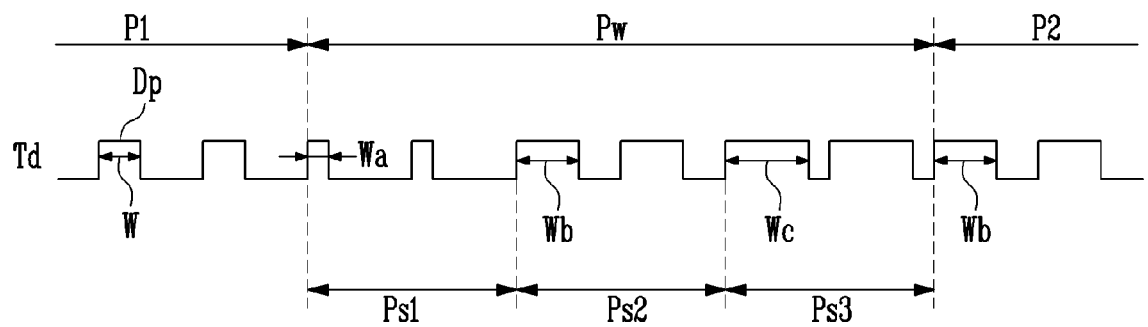

TOUCH SCREEN PANEL

CROSS-REFERENCE TO RELATED APPLICATIONS

This application claims priority to and the benefit of Korean Patent Application No. 10-2013-0118335, filed on Oct. 4, 2013, in the Korean Intellectual Property Office, the entire contents of which are incorporated herein by reference in their entirety.

BACKGROUND

1. Field

The described technology generally relates to a touch screen panel.

2. Description of the Related Technology

Touch screen panels are input devices that can detect a user's input to the panel based on contact between the user's hand or an object and the panel. The touch screen panel can select content displayed on a display device or the like based on the location of the input.

Touch screen panels are formed on the front face of display devices and convert a contact position into an electrical signal. Here, the user's hand or object directly contacts the touch screen panel at the contact position. Accordingly, the content displayed at the contact position is used as input for an input signal to the display device.

SUMMARY OF CERTAIN INVENTIVE ASPECTS

One inventive aspect is a touch screen panel, including a plurality of first touch electrodes, a plurality of second touch electrodes configured to intersect the first touch electrodes, and an electrode driving unit configured to supply a driving signal including a plurality of driving pulses to the first touch electrodes, wherein the electrode driving unit changes the width of the driving pulse in a state in which the frequency of the driving signal is maintained.

The touch screen panel may further include a noise measuring unit configured to measure a noise of a signal output from the second touch electrode.

When the noise level measured by the noise measuring unit is no less than a predetermined reference value, the electrode driving unit may change the width of the driving pulse.

When the noise level measured by the noise measuring unit is no less than the predetermined reference value, the electrode driving unit may variously change the width of the driving pulse during a pulse width searching period.

The noise measuring unit may measure the noise of the signal output from the second touch electrode during the pulse width searching period.

The touch screen panel may further include a pulse control unit configured to detect a driving pulse having a minimum noise level when the minimum noise level detected during the pulse width searching period is less than the reference value.

The electrode driving unit may change the width of the driving pulse included in the driving signal supplied to the first touch electrode to be equal to that of the driving pulse detected by the pulse control unit.

The pulse control unit may renew the reference value to be equal to the minimum noise level.

When the minimum noise level detected during the pulse width searching period is no less than the reference value, the pulse control unit may control the electrode driving unit not to change the width of the driving pulse.

The touch screen panel may further include a position detecting unit configured to detect a touch position, using the signal output from the second touch electrode.

The first and second touch electrodes may be formed of a transparent conductive material.

The electrode driving unit may sequentially supply the driving signal to the first touch electrodes.

Another aspect is a touch screen panel, comprising: a plurality of first touch electrodes; a plurality of second touch electrodes crossing the first touch electrodes; and an electrode driver configured to apply a driving signal including a plurality of first driving pulses each having a width to the first touch electrodes, wherein the electrode driver is further configured to change the width of each of the first driving pulses while maintaining the frequency of the first driving pulses.

The above panel further comprises a noise measuring unit configured to measure a noise level included in signals output from the second touch electrodes. In the above panel, the electrode driver is further configured to change the width of each of the first driving pulses when the noise level measured by the noise measuring unit is greater than or substantially equal to a predetermined reference value. In the above panel, the driving signal further includes a plurality of second driving pulses neighboring the first driving pulses, wherein at least two of the second driving pulses have different widths, and wherein the electrode driver is further configured to change the widths of the at least two of the second driving pulses during a pulse width searching period.

In the above panel, the noise measuring unit is further configured to measure the noise level of the signals during the pulse width searching period. The above panel further comprises a pulse controller configured to determine the width of a minimum driving pulse having the minimum measured noise level during the pulse width searching period. In the above panel, the electrode driver is further configured to change the width of each of the first driving pulses to be substantially equal to that of the minimum driving pulse.

In the above panel, the pulse controller is further configured to set the reference value to be substantially equal to the minimum noise level. In the above panel, the pulse controller is further configured to control the electrode driver to maintain the width of each of the first driving pulses. The above panel further comprises a position detector configured to detect a touch input position based at least in part on signals output from the second touch electrode. In the above panel, the first and second touch electrodes are formed at least partially of a transparent conductive material. In the above panel, the electrode driver is further configured to sequentially apply the driving signal to the first touch electrodes.

Another aspect is a touch screen panel, comprising: a plurality of first touch electrodes; a plurality of second touch electrodes crossing the first touch electrodes and configured to output a plurality of output signals; an electrode driver configured to apply a driving signal including a plurality of driving pulses, at least two of which have different widths, to the first touch electrodes; and a pulse controller configured to control the widths of the at least two driving pulses based at least in part on a noise level of the output signals.

In the above panel, the pulse controller is further configured to maintain the frequency of the driving pulses when controlling the widths of the at least two driving pulses. In the above panel, the pulse controller is further configured to sequentially increase the widths of the at least two driving pulses during a pulse width searching period. The above panel further comprises a noise measuring unit configured to measure the noise level of each of the output signals during the pulse width searching period, wherein the pulse controller is further configured to i) determine the width of a minimum driving pulse having a minimum noise level based at least in part on the measured noise levels and ii) control the width of each of the driving pulses to match the width of the minimum driving pulse. The above panel further comprises a position detector configured to detect a touch input position based at least in part on the output signals.

Another aspect is a touch screen panel, comprising: a plurality of first and second electrodes crossing each other, wherein the second electrodes are configured to output a plurality of output signals; and an electrode driver configured to apply a driving signal including a plurality of driving pulses to the first electrodes, wherein the electrode driver is further configured to change the width of at least one of the driving pulses so as to reduce noise in the output signals.

In the above panel, the electrode driver is further configured to maintain the frequency of the driving pulses. In the above panel, the driving pulses include at least two driving pulses having different widths and wherein the electrode driver is further configured to sequentially increase the widths of the at least two driving pulses during a pulse width searching period.

BRIEF DESCRIPTION OF THE DRAWINGS

FIGS. 2 and 3 are waveform diagrams illustrating a driving signal according to an embodiment.

FIG. 4 is a waveform diagram illustrating the operation of the touch screen panel according to an embodiment.

DETAILED DESCRIPTION OF CERTAIN INVENTIVE EMBODIMENTS

Touch screen panels can be used as input devices in place of a separate input device such as a keyboard or mouse. The number of applications for touch screen panels have been expanding. Touch screen panels can be categorized by technology, e.g., resistive overlay, photosensitive, electrostatic capacitive, and the like. Electrostatic capacitive touch screen panels detect a contact position by measuring a change in capacitance due to the input of a user's hand or object contacting the touch screen panel.

In the following detailed description, only certain exemplary embodiments have been shown and described, simply by way of illustration. As those skilled in the art would realize, the described embodiments may be modified in various different ways, all without departing from the spirit or scope of the described technology. Accordingly, the drawings and description are to be regarded as illustrative in nature and not restrictive.

Figure 1:
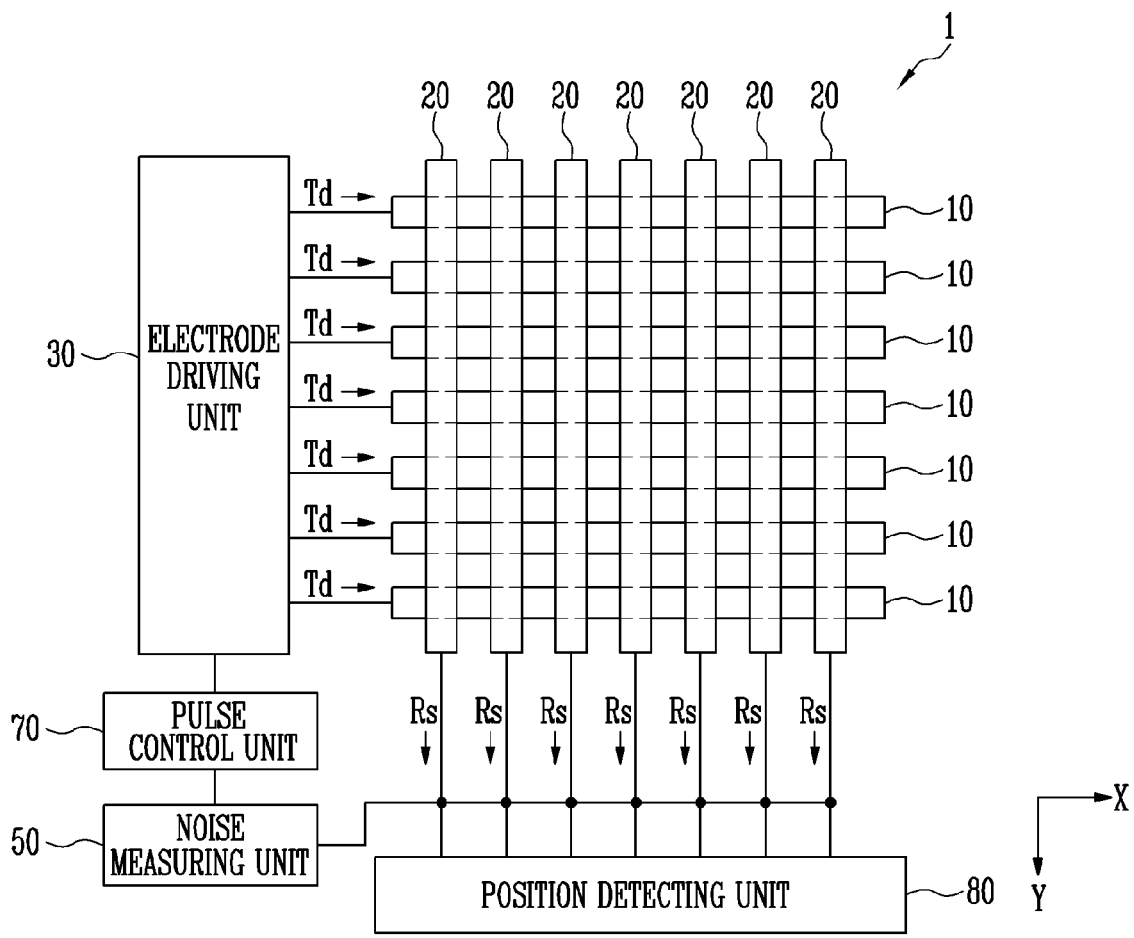
FIG. 1 is a diagram illustrating a touch screen panel according to an embodiment.
Figure 2:
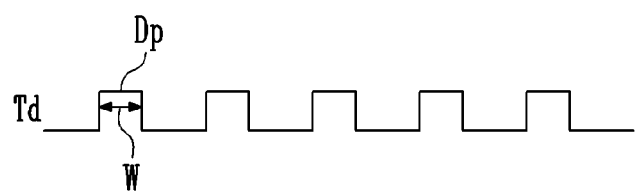

FIG. 1 is a diagram illustrating a touch screen panel according to an embodiment. FIGS. 2 and 3 are waveform diagrams illustrating a driving signal according to an embodiment.

FIG. 3 illustrates driving pulses Dp respectively having different widths Wa, Wb and Wc, when compared to the driving pulse Dp of FIG. 2.

Referring to FIG. 1, the touch screen panel 1 according to an embodiment includes a plurality of first touch electrodes 10, a plurality of second touch electrodes 20 and an electrode driving unit or electrode driver 30.

The first touch electrodes 10 extends in a first direction (e.g., an X-axis direction) so that a plurality of first touch electrodes 10 can be arranged in a second direction (e.g., a Y-axis direction) intersecting or crossing the first direction.

The first and second touch electrodes 10 and 20 may be driven together as a capacitive touch sensor.

The second touch electrodes 20 may be formed to intersect the first touch electrodes 10. For example, the second touch electrodes 20 extend in the second direction (e.g., the Y-axis direction) so that a plurality of second touch electrodes 20 can be arranged in the first direction (e.g., the X-axis direction).

Due to the above-described configuration, a mutual capacitance is formed between the first and second touch electrodes 10 and 20 and a change in capacitance due to a touch input can be measured through the second touch electrodes 20, thereby detecting the position of the touch input.

The touch screen panel 1 according to the embodiment shown in FIG. 1 further includes a position detecting unit or position detector 80.

The position detecting unit 80 detects a touch input position, using a signal Rs received from the second touch electrodes 20.

The position detecting unit 80 measures a change in mutual capacitance between the first and second touch electrodes 10 and 20 based on the signal Rs received through the second touch electrodes 20, thereby detecting a touch input position.

According to some embodiments, the first and second touch electrodes 10 and 20 are formed of a transparent conductive material. However, they may be formed of another conductive material such as an opaque metal in other embodiments.

For example, the first and second touch electrodes 10 and 20 may be formed of indium tin oxide (ITO), indium zinc oxide (IZO), graphene, carbon nanotube, silver nanowires (AgNWs), etc.

In order to prevent contact between the first and second touch electrodes 10 and 20, an insulating layer (not shown) may be interposed between the first and second touch electrodes 10 and 20.

The insulating layer (not shown) may be entirely formed between the first and second touch electrodes 10 and 20 or may be locally formed at only the intersections between the first and second touch electrodes 10 and 20.

Although it has been illustrated in FIG. 1 that the second touch electrodes 20 are formed above the first touch electrodes 10, the first touch electrodes 10 may be formed above the second touch electrodes 20 in other embodiments.

Seven first touch electrodes 10 and seven second touch electrodes 20 have been illustrated in FIG. 1. However, the number of first and second touch electrodes 10 and 20 is not limited thereto, and may be variously changed.

In addition, the number of first touch electrodes 10 and the number of second touch electrodes 20 may be different from each other.

The first and second touch electrodes 10 and 20 may be formed on a predetermined substrate (not shown).

In this embodiment, the substrate may be made of, for example, a material having an electrical insulation property, such as glass, plastic, silicon or synthetic resin. Alternatively, the substrate may be formed of metal or the like.

The substrate may be implemented as a film having flexibility to be bendable or foldable.

In the embodiment of FIG. 1, the electrode driving unit 30 applies a driving signal Td to the first touch electrodes 10, to drive the touch screen panel 1.

The electrode driving unit 30 sequentially supplies the driving signal Td to a plurality of first touch electrodes 10 in order to detect multiple touches.

As shown in FIG. 2, the driving signal Td applied to the first touch electrodes 10 includes a plurality of driving pulses Dp.

In order to minimize the influence of noise in the driving pulse Dp, the width W of the driving pulse Dp may be changed while maintaining the frequency of the driving signal Td.

That is, as shown in FIGS. 3(a), 3(b) and 3(c), the width of the driving pulse Dp included in the driving signal Td is changed according to time, i.e., location in the curve.

For example, a driving pulse Dp having a width Wa narrower than that of the driving pulse Dp of FIG. 2 has been shown in FIG. 3(a) and driving pulses Dp having widths Wb and Wc wider than that of the driving pulse Dp of FIG. 2 have been shown in FIGS. 3(b) and 3(c), respectively.

As shown in FIG. 3, the frequency of the driving signal Td is not changed, and therefore, the number of driving pulses Dp having the width Wa and the number of driving pulses Dp having the width Wb or Wc, generated in the same time period, are equal to each other.

The touch screen panel 1 according to the embodiment shown in FIG. 1 may further include a noise measuring unit 50.

The noise measuring unit 50 may measure the noise included in the signal Rs output from the second touch electrodes 20.

The electrode driving unit 30 may change the width W of the driving pulse Dp included in the driving signal Td when the level of the noise measured by the noise measuring unit 50 is greater than or substantially equal to a predetermined reference value.

That is, when it is highly likely that the accuracy of position detection will be decreased due to the existence of noise in the signal Rs received from the second touch electrodes 20, the electrode driving unit 30 may change the width W of the driving pulse Dp in order to reduce the influence of noise.

On the contrary, when the level of the noise measured by the noise measuring unit 50 is less than a predetermined reference value, the electrode driving unit 30 does not change the width W of the driving pulse Dp included in the current driving signal Td but may maintain the width W of the driving pulse Dp as it is.

As shown in the embodiment of FIG. 1, the touch screen panel 1 further includes a pulse control unit or pulse controller 70 configured to control the operation(s) of the electrode driving unit 30 and/or the noise measuring unit 50.

FIG. 4 is a waveform diagram illustrating the operation of the touch screen panel according to an embodiment.

First, during a first period P1, the electrode driving unit 30 applies the driving signal Td including driving pulses Dp with a specific width W to the first touch electrodes.

The noise measuring unit 50 measures the noise level of the signal Rs output from the second touch electrodes 20.

When the noise level measured by the noise measuring unit 50 is greater than or substantially equal to a predetermined value, the electrode driving unit 30 may move from the first period P1 to a pulse width searching period PW in order to determine a pulse width having a minimum noise level.

During the pulse width searching period PW, the electrode driving unit 30 may variously change the width of the driving pulse Dp.

For example, driving pulses having different widths Wa, Wb and Wc may be applied to the first touch electrodes 10 during each sub-period (Ps1, Ps2 or Ps3) included in the pulse width searching period Pw.

Referring to FIG. 4, driving pulses Dp having a first width Wa are applied during a first sub-period Ps1, driving pulses Dp having a second width Wb are applied during a second sub-period Ps2, and driving pulses Dp having a third width Wc are applied during a third sub-period Ps3.

During the pulse width searching period Pw, the noise measuring unit 50 measures the noise of the signal Rs output from the second touch electrodes 20.

For example, the noise measuring unit 50 may measure the noise level for each sub-period Ps1, Ps2 or Ps3 in which the width of the driving pulse Dp is changed.

Thus, noise levels can be respectively measured for each of the driving pulses Dp having different widths.

For example, the noise measuring unit 50 can measure the noise level when the driving pulse Dp having the first width Wa is applied, measure the noise level when the driving pulse Dp having the second width Wb is applied, and measure the noise level when the driving pulse Dp having the third width Wc is applied.

In some embodiments, the minimum noise level measured during the pulse width searching period Pw is less than the predetermined reference value. Thus, the pulse control unit 70 has identified a driving pulse Dp with a pulse width having a noise level less than the reference value.

The pulse control unit 70 may receive the noise level measured for each sub-period Ps1, Ps2 or Ps3 from the noise measuring unit 50 and determine the minimum noise level from among the received noise levels.

When the pulse control unit 70 has determined that the measured minimum noise level is less than the reference value by comparing the minimum noise level with the predetermined reference value, the pulse control unit 70 may determine which driving pulse Dp has the minimum noise level.

For example, when the noise measured during the second sub-period Ps2 has the minimum noise level, the pulse control unit 70 may determine that the driving pulse Dp having the second width Wb has the minimum noise level.

The electrode driving unit 30, under the control of the pulse control unit 70, may change the width W of the driving pulse Dp included in the driving signal Td to that of the driving pulse Dp determined by the pulse control unit 70 to have the minimum noise level. The electrode driving unit then applies this driving pulse Dp to the first touch electrodes 10.

For example, when the driving pulse Dp having the second width Wb is determined to be the driving pulse having the minimum noise level less than the reference value, the electrode driving unit 30 may set the width W of the current driving pulse Dp to the second width Wb.

Thus, the driving pulse Dp having the second width Wb can be applied to the first touch electrodes 10 in a second period P2 after the pulse width searching period Pw.

When the minimum noise level measured during the pulse width searching period Pw is less than the reference value, the pulse control unit 70 may reset the reference value to be equal to the minimum noise level.

However, when the minimum noise level measured during the pulse width searching period Pw is not less than the reference value, the pulse control unit 70 does not reset the reference value but may maintain the reference value as it is.

Furthermore, when the minimum noise level detected during the pulse width searching period Pw is greater than or substantially equal to the reference value, the pulse control unit 70 may control the electrode driving unit 30 not to change the width W of the driving pulse Dp.

That is, the pulse control unit 70 may determine that there is no driving pulse Dp with a first, second, or third width Wa, Wb, or We having a noise level less than the currently supplied driving pulse Dp. Thus, the pulse control unit 70 may control the electrode driving unit 30 to not change the width W of the current driving pulse Dp.

By way of summation and review, the related art capacitive touch screen panel may have a reduced performance and accuracy due to noise generated in the environment.

As described above, according to the described technology, it is possible to minimize the influence of noise by changing the width of a driving pulse, and it is unnecessary to change the frequency of a driving signal.

Exemplary embodiments have been described herein, and although specific terms have been employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A touch screen panel, comprising:
a plurality of first touch electrodes;
a plurality of second touch electrodes crossing the first touch electrodes; and
an electrode driver configured to apply a driving signal including a plurality of first driving pulses each having a width to the first touch electrodes; and
a noise measuring unit configured to measure a noise level included in signals output from the second touch electrodes,
wherein the electrode driver is further configured to: i) change the width of each of the first driving pulses while maintaining the frequency of the first driving pulses ii) compare the noise level measured by the noise measuring unit to a predetermined reference value and iii) change the width of each of the first driving pulses when the noise level measured by the noise measuring unit is greater than or substantially equal to the predetermined reference value.

2. The touch screen panel of claim 1, wherein the driving signal further includes a plurality of second driving pulses neighboring the first driving pulses, wherein at least two of the second driving pulses have different widths, and wherein the electrode driver is further configured to change the widths of the at least two of the second driving pulses during a pulse width searching period.

3. The touch screen panel of claim 2, wherein the noise measuring unit is further configured to measure the noise level of the signals during the pulse width searching period.

4. The touch screen panel of claim 3, further comprising a pulse controller configured to determine the width of a minimum driving pulse having the minimum measured noise level during the pulse width searching period.

5. The touch screen panel of claim 4, wherein the electrode driver is further configured to change the width of each of the first driving pulses to be substantially equal to that of the minimum driving pulse.

6. The touch screen panel of claim 4, wherein the pulse controller is further configured to set the reference value to be substantially equal to the minimum noise level.

7. The touch screen panel of claim 4, wherein the pulse controller is further configured to control the electrode driver to maintain the width of each of the first driving pulses.

8. The touch screen panel of claim 1, further comprising a position detector configured to detect a touch input position based at least in part on signals output from the second touch electrode.

9. The touch screen panel of claim 1, wherein the first and second touch electrodes are formed at least partially of a transparent conductive material.

10. The touch screen panel of claim 1, wherein the electrode driver is further configured to sequentially apply the driving signal to the first touch electrodes.

11. A touch screen panel, comprising:
a plurality of first touch electrodes;
a plurality of second touch electrodes crossing the first touch electrodes and configured to output a plurality of output signals;
an electrode driver configured to apply a driving signal including a plurality of driving pulses, at least two of which have different widths, to the first touch electrodes;
a pulse controller configured to control the widths of the at least two driving pulses based at least in part on a noise level of the output signals; and
a noise measuring unit configured to measure a noise level included in signals output from the second touch electrodes,
wherein the pulse controller is further configured to: i) compare the noise level measured by the noise measuring unit to a predetermined reference value and ii) change the width of each of the driving pulses when the noise level measured by the noise measuring unit is greater than or substantially equal to the predetermined reference value.

12. The touch screen panel of claim 11, wherein the pulse controller is further configured to maintain the frequency of the driving pulses when controlling the widths of the at least two driving pulses.

13. The touch screen panel of claim 11, wherein the pulse controller is further configured to sequentially increase the widths of the at least two driving pulses during a pulse width searching period.

14. The touch screen panel of claim 13, wherein the pulse controller is further configured to i) determine the width of a minimum driving pulse having a minimum noise level based at least in part on the measured noise levels and ii) control the width of each of the driving pulses to match the width of the minimum driving pulse.

15. The touch screen panel of claim 11, further comprising a position detector configured to detect a touch input position based at least in part on the output signals.

16. A touch screen panel, comprising:
a plurality of first and second electrodes crossing each other, wherein the second electrodes are configured to output a plurality of output signals;
an electrode driver configured to apply a driving signal including a plurality of driving pulses to the first electrodes; and
a noise measuring unit configured to measure a noise level included in signals output from the second touch electrodes,
wherein the electrode driver is further configured to: i) change the width of at least one of the driving pulses so as to reduce noise in the output signals ii) compare the noise level measured by the noise measuring unit to a predetermined reference value and iii) change the width of each of the driving pulses when the noise level measured by the noise measuring unit is greater than or substantially equal to the predetermined reference value.

17. The touch screen panel of claim 16, wherein the electrode driver is further configured to maintain the frequency of the driving pulses.

18. The touch screen panel of claim 16, wherein the driving pulses include at least two driving pulses having different widths and wherein the electrode driver is further configured to sequentially increase the widths of the at least two driving pulses during a pulse width searching period.

* * * * *